(12) United States Patent
Hill

(10) Patent No.: US 11,673,837 B2
(45) Date of Patent: *Jun. 13, 2023

(54) RADIOFREQUENCY COMPONENT INCLUDING A HIGH THERMAL CONDUCTIVITY COMPOSITE DIELECTRIC MATERIAL

(71) Applicant: Skyworks Solutions, Inc., Irvine, CA (US)

(72) Inventor: Michael David Hill, Frederick, MD (US)

(73) Assignee: Skyworks Solutions, Inc., Irvine, CA (US)

( * ) Notice: Subject to any disclaimer, the term of this patent is extended or adjusted under 35 U.S.C. 154(b) by 211 days.

This patent is subject to a terminal disclaimer.

(21) Appl. No.: 17/135,709

(22) Filed: Dec. 28, 2020

(65) Prior Publication Data

US 2021/0114938 A1   Apr. 22, 2021

Related U.S. Application Data

(60) Continuation of application No. 17/020,774, filed on Sep. 14, 2020, now Pat. No. 11,370,711, which is a continuation of application No. 16/865,174, filed on May 1, 2020, now abandoned, which is a continuation of application No. 16/272,411, filed on Feb. 11, 2019,
(Continued)

(51) Int. Cl.
*C04B 35/117* (2006.01)
*C04B 35/46* (2006.01)
*C04B 35/465* (2006.01)

(52) U.S. Cl.
CPC ............ *C04B 35/117* (2013.01); *C04B 35/46* (2013.01); *C04B 35/465* (2013.01); *C04B 2235/3206* (2013.01); *C04B 2235/3208* (2013.01); *C04B 2235/3222* (2013.01); *C04B 2235/3224* (2013.01); *C04B 2235/3225* (2013.01); *C04B 2235/3227* (2013.01); *C04B 2235/3232* (2013.01); *C04B 2235/3234* (2013.01); *C04B 2235/3236* (2013.01); *C04B 2235/3255* (2013.01); *C04B 2235/9607* (2013.01)

(58) Field of Classification Search
CPC ..... C04B 35/117; C04B 35/20; C04B 35/443; C04B 35/465

See application file for complete search history.

(56) References Cited

U.S. PATENT DOCUMENTS 4,614,725 A  9/1986 Ando
4,721,692 A  1/1988 Nishioka
(Continued)

FOREIGN PATENT DOCUMENTS

JP  06-048823  2/1994
JP  09183648   7/1997
JP  2006-124217  5/2006

*Primary Examiner* — Karl E Group
(74) *Attorney, Agent, or Firm* — Knobbe, Martens, Olson & Bear, LLP

(57) ABSTRACT

Disclosed herein are embodiments of materials having high thermal conductivity along with a high dielectric constants. In some embodiments, a two phase composite ceramic material can be formed having a contiguous aluminum oxide phase with a secondary phase embedded within the continuous phase. Example secondary phases include calcium titanate, strontium titanate, or titanium dioxide.

20 Claims, 12 Drawing Sheets

Related U.S. Application Data now abandoned, which is a division of application No. 15/470,613, filed on Mar. 27, 2017, now Pat. No. 10,246,375.

(60) Provisional application No. 62/315,241, filed on Mar. 30, 2016.

(56) References Cited

U.S. PATENT DOCUMENTS

| | | | |
|---|---|---|---|
| 5,076,815 A | 12/1991 | Kunz | |
| 5,104,834 A | 4/1992 | Watanabe | |
| 5,447,894 A | 9/1995 | Yasuoka | |
| 5,902,763 A | 5/1999 | Waku | |
| 6,362,120 B1 | 3/2002 | Fukushima | |
| 6,723,674 B2 | 4/2004 | Wang | |
| 8,357,262 B2 | 1/2013 | Nakahara et al. | |
| 10,246,375 B2 | 4/2019 | Hill | |
| 11,370,711 B2 * | 6/2022 | Hill | C04B 35/46 |
| 2002/0034667 A1 | 3/2002 | Sengupta et al. | |
| 2002/0151429 A1 | 10/2002 | Jacquin | |
| 2002/0165080 A1 | 11/2002 | Sengupta et al. | |
| 2004/0063566 A1 | 4/2004 | Caspers et al. | |
| 2005/0230884 A1 | 10/2005 | Schallner et al. | |
| 2006/0194690 A1 | 8/2006 | Osuzu et al. | |
| 2007/0128450 A1 | 6/2007 | Mori et al. | |
| 2007/0237935 A1 | 10/2007 | Mori et al. | |
| 2008/0283499 A1 | 11/2008 | Nakahara et al. | |
| 2009/0088314 A1 | 4/2009 | Abe et al. | |
| 2017/0283327 A1 * | 10/2017 | Hill | C04B 35/117 |
| 2019/0256423 A1 | 8/2019 | Hill | |
| 2019/0256424 A1 | 8/2019 | Hill | |
| 2021/0101834 A1 * | 4/2021 | Hill | C04B 35/46 |

* cited by examiner

RADIOFREQUENCY COMPONENT INCLUDING A HIGH THERMAL CONDUCTIVITY COMPOSITE DIELECTRIC MATERIAL

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

This disclosure generally relates to composite ceramic materials having high thermal conductivity and a high dielectric constant.

Description of the Related Art

Many emerging applications for high dielectric materials require the dielectric material to be heated and cooled very rapidly during active use. This can lead to the possibility of thermal shock of the material, in particular when the heating and cooling is applied to monolithic polycrystalline ceramic dielectrics. Thermal shock can occur when a change in temperature forms a thermal gradient on a material, which then causes different portions of the material to expand or contract by different amounts as compared with other portions of the material. This differential in the expansion of different portions of the material can cause increased stress and/or strain between the portions. If the stress/strain is too great, be it after repeated stress/strain or a high initial stress/strain, cracks can form into the material. Eventually, the cracks can lead to structural failure of the material. Thus, thermal shock can physically damage the high dielectric material, making it unusable for its intended purpose. Moreover, thermal shock to the material can also lead to overall damage of components that the material is incorporated into.

Further, applications requiring high power levels, such as certain lighting systems, require very high thermal conductivity materials in order to function at their optimal levels. However, a significant problem is that most high thermal conductivity ceramics are expensive, extremely toxic, and/or have low dielectric constants.

SUMMARY

Disclosed herein are embodiments of a dual-phase composite ceramic material, the material comprising a primary phase, and at least one secondary phase located within the primary phase forming a dual-phase composite, the dual-phase composite can have a dielectric constant of greater than 20 and a thermal conductivity of greater than 20 $W \cdot m^{-1} \cdot K^{-1}$.

In some embodiments, the primary phase can include aluminum oxide. In some embodiments, the primary phase can be generally contiguous. In some embodiments, the dual-phase composite can have a dielectric constant of greater than 25. In some embodiments, the thermal conductivity can be greater than 30 $W \cdot m^{-1} \cdot K^{-1}$.

In some embodiments, the secondary phase can be generally non-reactive with aluminum oxide. In some embodiments, the secondary phase can include more than one composition. In some embodiments, the secondary phase can be selected from the group consisting of $CaTiO_3$, $TiO_2$, $LaAlO_3$, $La_2MgTiO_6$, $YAlO_3$, $SmAlO_3$, $Mg_4Nb_2O_9$, and $La_4Ti_3O_{12}$.

In some embodiments, the dual-phase composite can have a temperature drift of resonant frequency lower than 1000 ppm/Degree C. In some embodiments, the primary phase can include aluminum oxide and the secondary phase includes a high dielectric constant material.

Also disclosed herein are embodiments of a method of forming a dual-phase composite ceramic material, the method comprising mixing together materials that will form out a primary generally contiguous phase and a secondary non-contiguous phase, materials forming the primary phase being generally non-reactive with materials forming the secondary phase, and sintering the materials to form a composite ceramic having the primary generally contiguous phase and the secondary non-contiguous phase, the composite ceramic having a dielectric constant of greater than 20 and a thermal conductivity of greater than 20 $W \cdot m^{-1} \cdot K^{-1}$.

In some embodiments, the primary phase can include aluminum oxide and the secondary phase includes a metallic oxide. In some embodiments, the composite ceramic can have a thermal conductivity of greater than 30 $W \cdot m^{-1} \cdot K^{-1}$. In some embodiments, the primary phase can include aluminum oxide and the secondary phase includes a high dielectric constant material.

Also disclosed herein are embodiments of a radiofrequency component formed from a ceramic material comprising a primary phase, the primary phase being generally contiguous, and at least one secondary phase located within the primary phase forming a dual-phase composite, the dual-phase composite having a dielectric constant of greater than 20 and a thermal conductivity of greater than 20 $W \cdot m^{-1} \cdot K^{-1}$.

In some embodiments, the primary phase can include aluminum oxide and the secondary phase is selected from the group consisting of $CaTiO_3$, $TiO_2$, $LaAlO_3$, $La_2MgTiO_6$, $YAlO_3$, $SmAlO_3$, $Mg_4Nb_2O_9$, and $La_4Ti_3O_{12}$. In some embodiments, the primary phase can include aluminum oxide and the secondary phase includes a high dielectric constant material.

In some embodiments, the radiofrequency component can be incorporated into solid state lighting. In some embodiments, the radiofrequency component can be incorporated into a cellular tower. In some embodiments, the radiofrequency component can be used at frequencies of greater than 100 MHz.

DETAILED DESCRIPTION

Disclosed herein are embodiments of ceramic materials and methods of manufacturing said materials which can have high thermal conductivity as well as a high dielectric constant. In some embodiments, the ceramic material can be formed as a composite material having multiple phases. In particular, a two-phase ceramic material can be formed, each of the phases having unique and advantageous properties to improve the overall two-phase ceramic material. The combination of the two phases can allow the composite material to generally maintain, or improve, the high properties achieved by each of the phases in the composite ceramic individually. The properties achieved by embodiments of the disclosed composite ceramics can be advantageous for many different technologies, especially for radiofrequency (RF) applications in the high frequency ranges (>100 MHz) and cellular communications. Further, embodiments of the disclosed material can be used for solid-state lighting. Embodiments of the materials can be further used for other applications, and the particular application of the material is not limiting.

Figure 1:
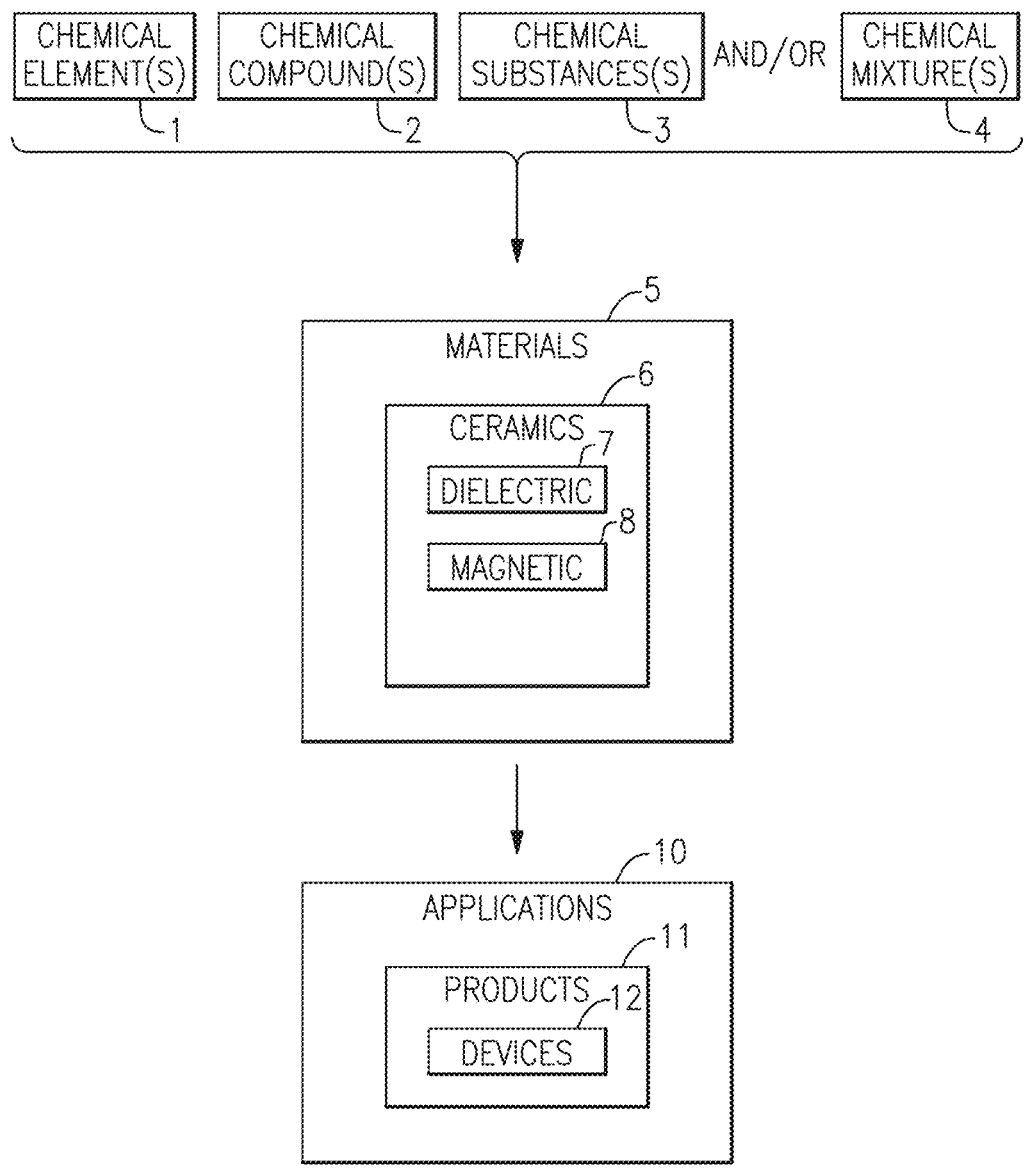
FIG. 1 schematically shows how materials having one or more features described herein can be designed, fabricated, and used.

FIG. 1 schematically shows how one or more chemical elements (block 1), chemical compounds (block 2), chemical substances (block 3) and/or chemical mixtures (block 4) can be processed to yield one or more materials (block 5) having one or more features described herein. In some embodiments, such materials can be formed into ceramic materials (block 6) configured to include a desirable dielectric property (block 7), a magnetic property (block 8) and/or an advanced material property (block 9).

In some embodiments, a material having one or more of the foregoing properties can be implemented in applications (block 10) such as radio-frequency (RF) application. Such applications can include implementations of one or more features as described herein in devices 12. In some applications, such devices can further be implemented in products 11. Examples of such devices and/or products are described herein.

Dual-Phase Composite Ceramic Material

Composite materials, also known as composition materials or composites, are materials that can be formed from two or more constituent materials. Typically, the two or more materials have different physical, performance, and/or chemical properties. Once combined, the final composite can have different physical, performance, and/or chemical properties than the individual constituent materials. In some embodiments, the individual constituent materials can remain separate in the final composite material by forming separate phases.

Composite materials have a number of applications in the current materials space. The can be used in mortars, concretes, plastics, metals, and ceramics. Discussed herein are embodiments of composite ceramic materials.

Useful materials for applications as disclosed herein are composite materials. In some embodiments, a composite ceramic material can be formed out of two or more different phases which can be found in the same material upon stabilization. In particular, the composite ceramic can be formed from a first (or primary) phase, which can be one contiguous phase, with particles/portions/sections of a secondary phase (and/or tertiary/quaternary/etc. phases) embedded within the contiguous phase, thereby creating a dual-phase composite material. In some embodiments, a third phase of material can be embedded into the first phase, the second phase, both phases, or can cross the phases.

Figure 2A:
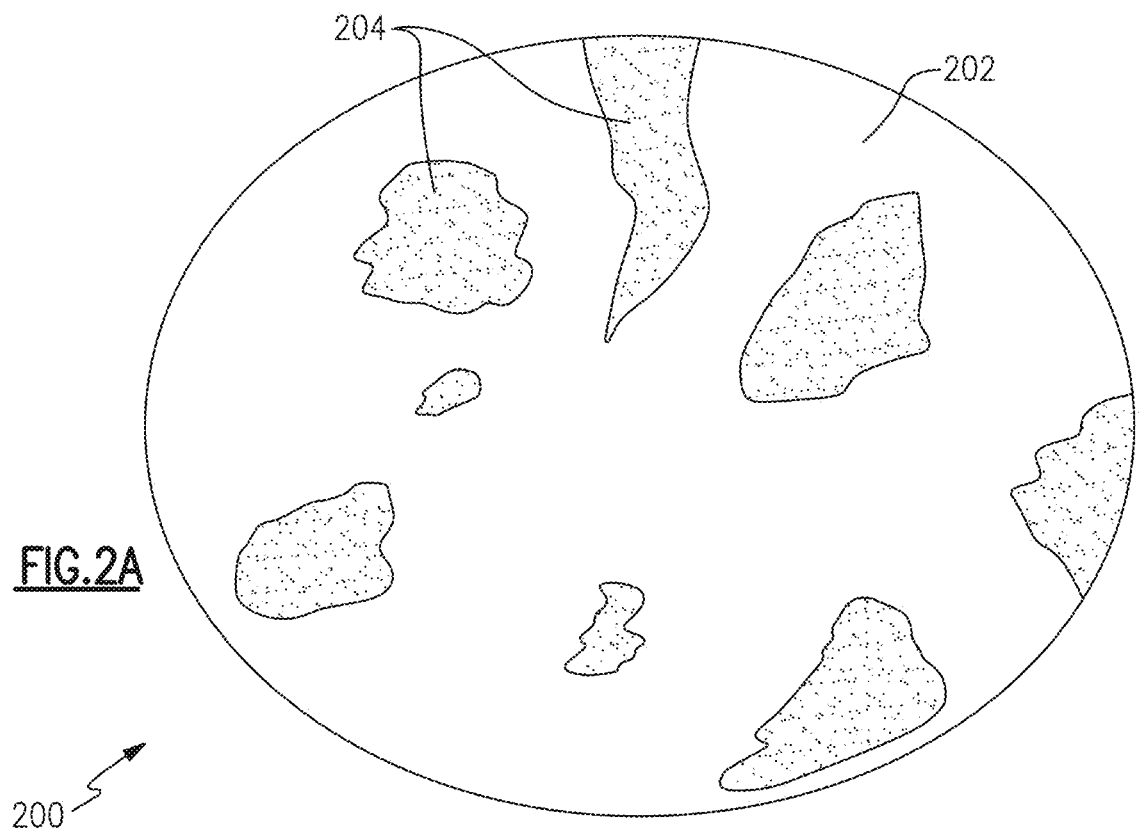
FIGS. 2A-B illustrate structural overviews of embodiments of a composite material disclosed herein.
Figure 2B:
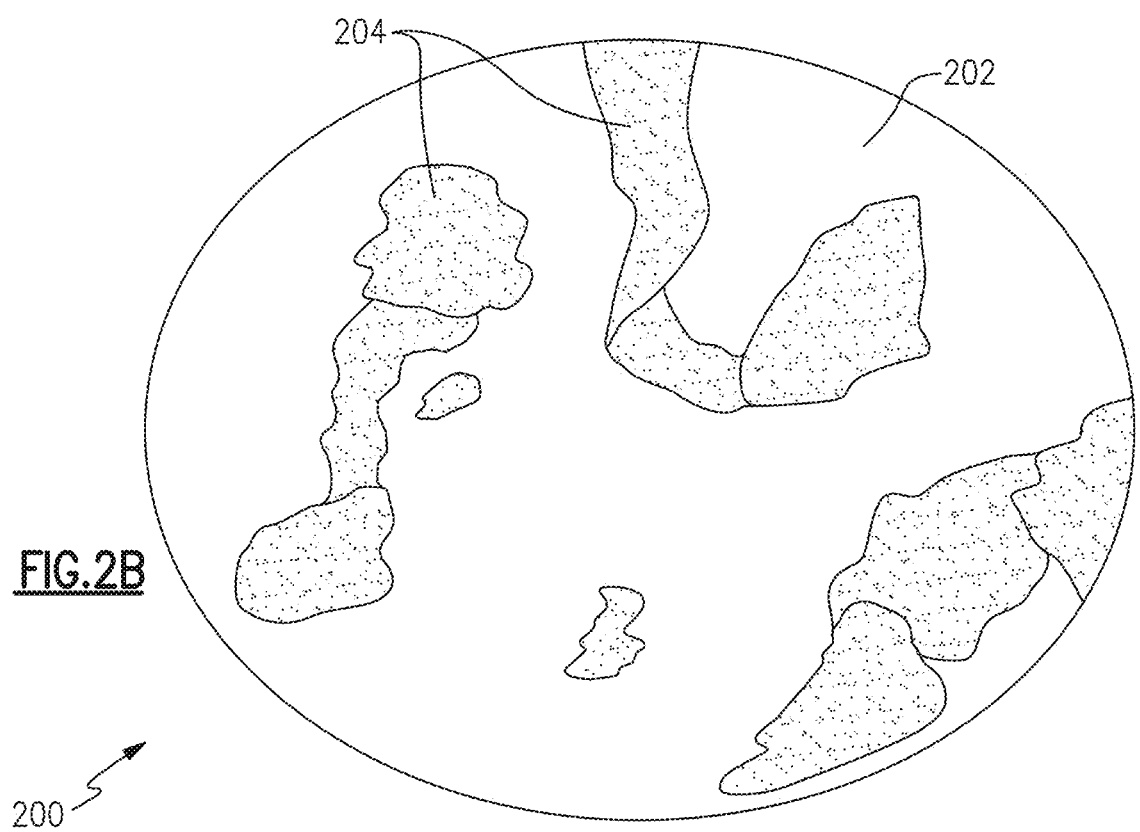

An example embodiment of such a dual-phase material is shown in FIGS. 2A-2B. As shown in FIG. 2A, the composite ceramic material 200 can have a base primary phase material 202. Further, portions of secondary phase material 204 can be scattered throughout the primary phase material 202. FIG. 2B illustrates a more connected secondary phase material 204 as compared to the embodiment of FIG. 2A. FIGS. 2A-B show just an example of a composite ceramic 200, and the particular location of the different phases is not limiting. The primary phase can be generally contiguous whereas the secondary phase can form isolated "islands" within the primary phase. In some embodiments, there can be two dispersed second phases existing within the primary phase. For example, they can be isolated from one another forming separate "islands" within the primary phase. However, there is a statistical possibility of the two secondary phases coming into contact with one another. In some cases, there may be a small reaction zone at the interface of the primary phase and one or more of the secondary phases.

In some embodiments, the primary phase may not be fully contiguous as the secondary phase may cut off portions of it due to various formation methods. In some embodiments, the primary phase may be fully contiguous. In some embodiments, the primary phase may be fully contiguous over a 1×1 inch, 2×2 inch, 3×3 inch, 4×4 inch, or 5×5 inch area. Further, the secondary phase may be a number of different portions within the first phase, or can be represented by a larger singular portion within the first phase.

The secondary phase can also be composed of a number of different materials, and thus the secondary phase can form with some locations having material A whereas other locations can have material B or combinations of both. In some embodiments, a location can be a majority A and in other locations can be a majority B. In some embodiments, the secondary phases can be identical to one another in structure or composition in some embodiments. In some embodiments, the secondary phases may be generally the same with minor variations/impurities. In some embodiments the secondary phases may act in generally the same or an identical manner while having compositional differences. It will be understood that while one of the phases is described as "secondary", the particular amount of the material forming the secondary phase may be greater than, equal to, or lower than the primary phase. The particular structure of the final composite is not limiting.

Compositions for Embodiments of Dual-Phase Ceramic Materials

In some embodiments, the dual-phase ceramic materials can be partially or fully defined by its composition. Further, these compositions can lead to a particular microstructure formation, which can be used to fully or partially define the material. The dual-phase ceramic material can include two different ceramics, and may not include other materials such as metals or polymers/plastics.

In some embodiments, the use of aluminum oxide ($Al_2O_3$), such as alumina, has been shown to allow for advantageous properties to form in the dual-phase composite ceramic. Alumina and aluminum oxide can be used interchangeably herein. Alumina itself typically has a low dielectric constant, 8 (or about 8), though it has very good thermal conductivity, 30 $W \cdot m^{-1} \cdot K^{-1}$ (or about 30). Thus, aluminum oxide may be advantageous for the base material and form the primary phase in a dual-phase composite material.

Accordingly, a two-phase ceramic material can be designed with aluminum oxide as the primary phase and particles of a second phase material with a higher dielectric constant can be incorporated into the aluminum oxide so as to create a material with a high dielectric constant and good thermal conductivity. Thus the dispersed second phase can give the composite with alumina an overall higher dielectric constant than a pure aluminum oxide ceramic. The dielectric constant and thermal conductivity can be balanced to optimize the particular advantageous qualities of the material.

In some embodiments, other primary phase materials may be used as well. For example, spinels, such as $MgAl_2O_4$, $Mg_2SiO_4$ (forsterite), and cordierite can be used as the primary phase.

The second phase material may be, for example, calcium titanate, strontium titanate or titanium dioxide with other phases added to adjust the temperature coefficient of the dielectric resonant frequency. Other phases can include solid solutions based on calcium titanate, for example $Ca_{1-x}La_{2/3x}TiO_3$. However, other materials can be used as well, such as different compositions incorporating lanthanum aluminate, and the particular materials are not limiting. In particular, metallic oxides as a whole can provide advantageous properties to the aluminum oxide. In some embodiments, second phase materials can be high dielectric constant materials (e.g., >30) with the perovskite, orthorhombic tungsten bronze, alpha-lead oxide, or rutile structure.

By adding the secondary phase material with a high dielectric constant to aluminum oxide and creating a two phase composite with aluminum oxide being the contiguous phase, a high thermal conductivity composite ceramic with a dielectric constant of 20 or greater may be obtained. In some embodiments, the dielectric constant can be 20 or greater (or about 20 or greater), 25 or greater (or about 25 or greater), 30 or greater (or about 30 or greater), or 35 or greater (or about 35 or greater).

In some embodiments, the material may also still exhibit high thermal conductivity, thereby reducing thermal shock. For example, the thermal conductivity can be at least as high as that of aluminum oxide by itself. Thus, the secondary phases may not negatively, or at least may not significantly negatively, affect the thermal conductivity of the material. In some embodiments, the thermal conductivity of the composite ceramic disclosed herein can be within 20% (or within about 20%), 10% (or within about 10%), 5% (or within about 5%), or 1% (or within about 1%) of the thermal conductivity of alumina. In some embodiments, the thermal conductivity of embodiments of the disclosed material can be 20 $W \cdot m^{-1} \cdot K^{-1}$ or greater (or about 20 $W \cdot m^{-1} \cdot K^{-1}$ or greater). In some embodiments, the thermal conductivity of embodiments of the disclosed material can be 30 $W \cdot m^{-1} \cdot K^{-1}$ or greater (or about 30 $W \cdot m^{-1} \cdot K^{-1}$ or greater). Thus, embodiments of the materials can be used during quick heating and cooling processes, as there is a lower possibility of thermal shock.

In some embodiments, the composite material may have a lower temperature drift of resonant frequency ($t_F$). It can be advantageous to have a low $t_F$ to avoid any change in dielectric constant as the material is heated. In some embodiments, the composite material can have a temperature drift of resonant frequency lower than 3000 ppm/Degree (or lower than about 3000 ppm/Degree), lower than 2000 ppm/Degree (or lower than about 2000 ppm/Degree), lower than 1000 ppm/Degree C. (or lower than about 1000 ppm/Degree).

Table I below illustrates compositions having a primary alumina phase with different types of additive secondary phases of titanium oxide, wherein the secondary phase is only a single type of ceramic.

TABLE I

Two Material Composite Ceramics and Their Properties

| Wt. % Alumina | Additive | Wt. % additive | Firing Temperature | Fired Density (g/cm³) | Fired Dielectric Constant |
|---|---|---|---|---|---|
| 33.2 | CaTiO₃ | 66.8 | 1400 | 3.94 | 70.89 |
| 33.2 | CaTiO₃ | 66.8 | 1450 | 3.81 | 57.75 |
| 33.2 | CaTiO₃ | 66.8 | 1475 | 3.75 | 60.72 |
| 31 | TiO₂ | 69.0 | 1440 | 3.59 | 28.52 |
| 31 | TiO₂ | 69.0 | 1400 | 3.44 | 27.96 |
| 33.4 | CaTiO₃ | 66.6 | 1390 | 3.93 | 95.52 |
| 36.0 | CaTiO₃ | 64.0 | 1390 | 3.94 | 93.06 |
| 40.0 | CaTiO₃ | 60.0 | 1390 | 3.93 | 85.97 |
| 43.0 | CaTiO₃ | 57.0 | 1390 | 3.95 | 80.80 |
| 47.0 | CaTiO₃ | 53.0 | 1390 | 3.95 | 73.70 |
| 50.0 | CaTiO₃ | 50.0 | 1390 | 3.95 | 68.20 |
| 54.0 | CaTiO₃ | 46.0 | 1390 | 3.93 | 61.30 |
| 58.0 | CaTiO₃ | 42.0 | 1390 | 3.94 | 54.70 |
| 55.0 | CaTiO₃ | 45.0 | 1390 | 3.93 | 54.86 |

As shown in the above table, very high levels of dielectric constant can be formed. In fact, dielectric constants over 90 can be achieved.

Table II shows different compositions having alumina as the primary material with multi-compositional secondary phase ceramics embedded within the alumina.

TABLE II

Three Material Composite Ceramics and Their Properties

| Wt. % Alumina | Wt % CaTiO₃ | Wt. % LaAlO₃ | Wt % La₂MgTiO₆ | Firing Temp. | Fired Density (g/cm³) | Temperature Drift of resonant frequency ($t_F$) | Fired Dielectric Constant |
|---|---|---|---|---|---|---|---|
| 34 | 56 | 10 | | 1390 | 4.11 | +320.25 | 63.34 |
| 34 | 50 | 16 | | 1390 | 4.15 | +243.81 | 52.55 |
| 34 | 44 | 22 | | 1390 | 4.16 | +174.63 | 41.63 |
| 44 | 50 | 6 | | 1390 | 4.03 | +417.9 | 57.80 |
| 44 | 44 | 12 | | 1390 | 4.11 | +262.15 | 45.05 |
| 44 | 36 | 20 | | 1390 | 4.14 | | 34.66 |
| 34 | 56 | | 10 | 1390 | 4.05 | +366.11 | 62.30 |
| 34 | 50 | | 16 | 1390 | 4.13 | +274.76 | 56.51 |
| 34 | 44 | | 22 | 1390 | 4.20 | +180 | 47.39 |

TABLE II-continued

Three Material Composite Ceramics and Their Properties

| Wt. % Alumina | Wt % CaTiO$_3$ | Wt. % LaAlO$_3$ | Wt % La$_2$MgTiO$_6$ | Firing Temp. | Fired Density (g/cm$^3$) | Temperature Drift of resonant frequency (t$_F$) | Fired Dielectric Constant |
|---|---|---|---|---|---|---|---|
| 44 | 50 |  | 6 | 1390 | 3.97 | +399 | 52.39 |
| 44 | 44 |  | 12 | 1390 | 4.05 | +268 | 45.02 |
| 44 | 36 |  | 20 | 1390 | 4.15 | +175 | 40.40 |
| 34 | 50 | 16 |  | 1390 | 4.12 |  | 50.51 |

The secondary phases discussed in Table II can separate into separate phases (e.g., phases A, B, and C). As shown, dual-phase composites can again achieve high dielectric constants, such as above 40, 50, or 60.

However, high dielectric constants may negatively affect the temperature drift of resonant frequency, meaning that as the material is heated up, the dielectric constant can drop off.

Table III shows different compositions having alumina as the primary material with multi-compositional secondary phase ceramics embedded within the alumina.

TABLE III

Three Material Composite Ceramics and Their Properties

| Wt. % Alumina | Wt % CaTiO$_3$ | Wt. % YAlO$_3$ | Wt % SmAlO$_3$ | Firing Temperature | Temperature Drift of resonant frequency (t$_F$) | Fired Dielectric Constant |
|---|---|---|---|---|---|---|
| 34 | 56 | 10 |  | 1390 | +201.62 | 71.22 |
| 44 | 50 | 6 |  | 1390 | +298 | 46.78 |
| 34 | 56 |  | 10 | 1390 | +322 | 57.65 |
| 34 | 50 |  | 16 | 1390 | +171.7 | 44.51 |
| 34 | 44 |  | 22 | 1390 | +100.11 | 35.58 |
| 44 | 50 |  | 6 | 1390 | +397.96 | 54.69 |
| 44 | 44 |  | 12 | 1390 | +198 | 39.83 |
| 44 | 36 |  | 20 | 1390 | +75.99 | 28.55 |
| 50 | 40 |  | 10 | 1390 | +130.81 | 36.67 |
| 40 | 47 |  | 13 | 1390 | +196.53 | 42.69 |
| 44 | 41 |  | 15 | 1390 | +193.94 | 34.80 |

The secondary phases discussed in Table II can separate into separate phases (e.g., phases A, B, and C). Once again, high dielectric constant composite materials can be formed.

Table IV shows different compositions having alumina as the contiguous primary material with multi-compositional secondary phase ceramics embedded within the alumina.

TABLE IV

Three Material Composite Ceramics and Their Properties

| Wt. % Alumina | Wt % CaTiO$_3$ | Wt. % LaAlO$_3$ | Wt % Other | Firing Temperature | Temperature Drift of resonant frequency (t$_F$) | Fired Dielectric Constant |
|---|---|---|---|---|---|---|
| 44 | 36 | 20 |  | 1390 | +169.82 | 34.1 |
| 40 | 36 | 20 | 4% Mg$_4$Nb$_2$O$_9$ | 1390 | +125.78 | 32.35 |
| 36 | 36 | 20 | 8% Mg$_4$Nb$_2$O$_9$ | 1390 | +177.33 | 34.29 |
| 44 | 36 | 16 | 4% Mg$_4$Nb$_2$O$_9$ | 1390 | +164.18 | 36.34 |
| 40 | 36 | 16 | 8% Mg$_4$Nb$_2$O$_9$ | 1390 | +115.82 | 30.87 |
| 44 | 36 | 18 | 2% La$_4$Ti$_3$O$_{12}$ | 1390 | +156.97 | 34.53 |
| 44 | 36 | 16 | 4% La$_4$Ti$_3$O$_{12}$ | 1390 | +151.4 | 34.94 |
| 48 | 36 | 14 | 2% La$_4$Ti$_3$O$_{12}$ | 1390 | +172.42 | 34.98 |
| 48 | 36 | 12 | 4% La$_4$Ti$_3$O$_{12}$ | 1390 | +167.2 | 35.24 |
| 44 | 36 |  | 20% SmAlO$_3$ | 1390 | +66.62 | 27.95 |

TABLE IV-continued

Three Material Composite Ceramics and Their Properties

| Wt. % Alumina | Wt % CaTiO$_3$ | Wt. % LaAlO$_3$ | Wt % Other | Firing Temperature | Temperature Drift of resonant frequency ($t_F$) | Fired Dielectric Constant |
|---|---|---|---|---|---|---|
| 40 | 36 | | 20% SmAlO$_3$ + 4% Mg$_4$Nb$_2$O$_9$ | 1390 | +81.96 | 28.71 |
| 36 | 36 | | 20% SmAlO$_3$ + 8% Mg$_4$Nb$_2$O$_9$ | 1390 | +91.82 | 29.08 |
| 44 | 36 | | 16% SmAlO$_3$ + 4% Mg$_4$Nb$_2$O$_9$ | 1390 | +108.97 | 31.81 |
| 40 | 36 | | 16% SmAlO$_3$ + 8% Mg$_4$Nb$_2$O$_9$ | 1390 | +103.27 | 32.65 |

The secondary phases discussed in Table II can separate into separate phases (e.g., phases A, B, and C). As above, the materials disclosed in the above table can have high dielectric constants, such as above about 27, 28, 29, 30, 31, 32, 33, 34, and 35.

Preparation of the Composite Ceramic Materials:

The preparation of embodiments of the above-discussed composite materials can be accomplished by using known ceramic techniques. A particular example of the process flow is illustrated in FIG. 3.

Figure 3:
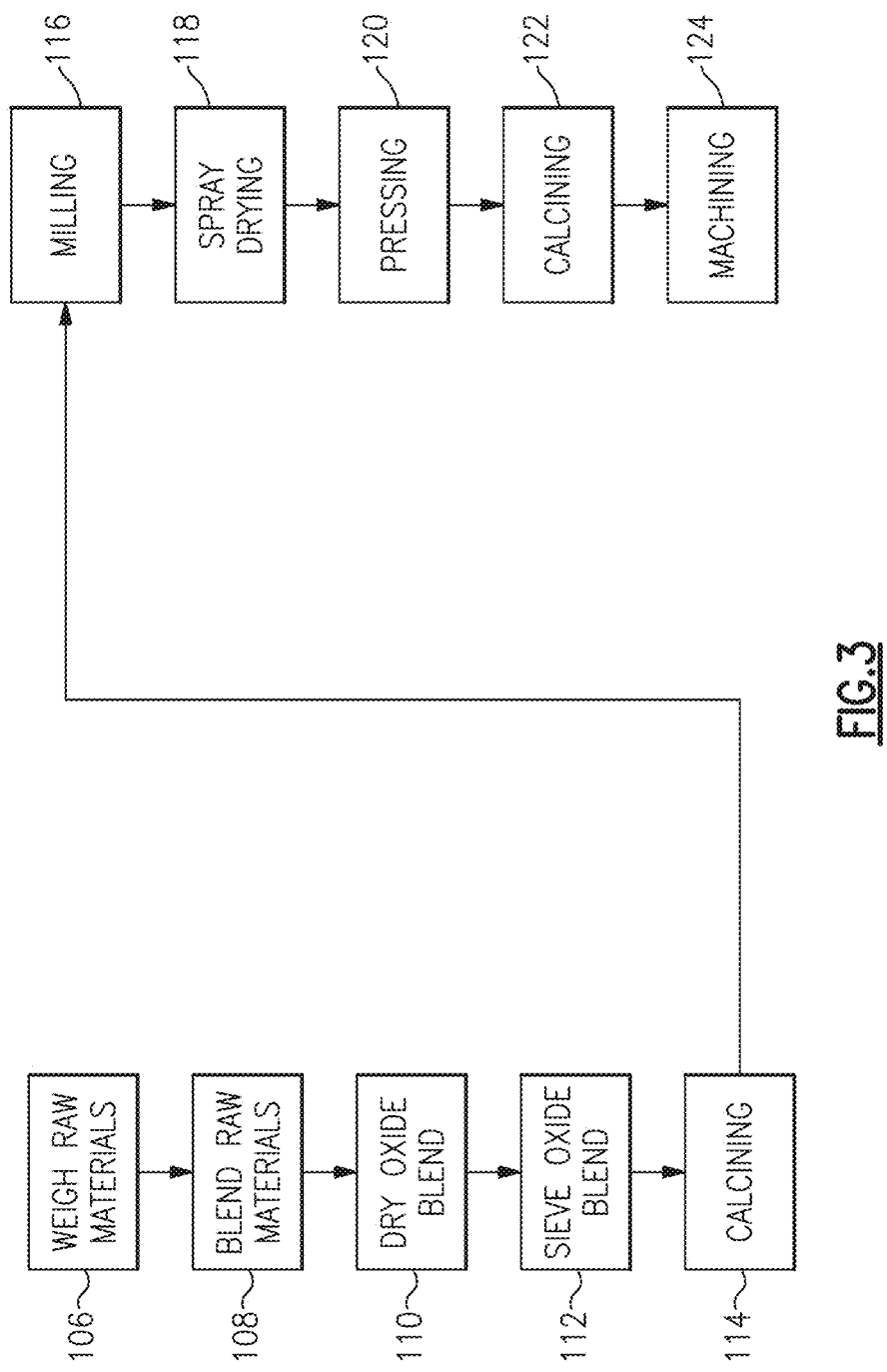
FIG. 3 illustrates an example process flow for making an embodiment of a composite ceramic material having one or more features described herein.

As shown in FIG. 3, the process begins with step 106 for weighing the raw material. The raw material may include oxides and carbonates such as Al$_2$O$_3$, CaTiO$_3$, TiO$_2$, LaAlO$_3$, La$_2$MgTiO$_6$, YAlO$_3$, SmAlO$_3$, Mg$_4$Nb$_2$O$_9$, La$_4$Ti$_3$O$_{12}$, or combinations thereof. In addition, organic based materials may be used in a sol gel process for ethoxides and/or acrylates or citrate based techniques may be employed. Other known methods in the art such as co-precipitation of hydroxides, sol-gel, or laser ablation may also be employed as a method to obtain the materials. The amount and selection of raw material depends on the specific formulation.

After the raw materials are weighed, they are blended in Step 108 using methods consistent with the current state of the ceramic art, which can include aqueous blending using a mixing propeller, or aqueous blending using a vibratory mill with steel or zirconia media. In some embodiments, a glycine nitrate or spray pyrolysis technique may be used for blending and simultaneously reacting the raw materials.

The blended oxide is subsequently dried in Step 110, which can be accomplished by pouring the slurry into a pane and drying in an oven, preferably between 100-400° C. or by spray drying, or by other techniques known in the art.

The dried oxide blend is processed through a sieve in Step 112, which homogenizes the powder and breaks up soft agglomerates that may lead to dense particles after calcining.

The material is subsequently processed through a pre-sintering calcining in Step 114. Preferably, the material is loaded into a container such as an alumina or cordierite sagger and heat treated in the range of about 800-1600° C.

After calcining, the material is milled in Step 116, preferably in a vibratory mill, an attrition mill, a jet mill or other standard comminution technique to reduce the median particle size into the range of about 0.1 to 10.0 microns, though in some embodiments larger or smaller sizes may be used as well. Milling is preferably done in a water based slurry but may also be done in ethyl alcohol or another organic based solvent.

The material is subsequently spray dried in Step 118. During the spray drying process, organic additives such as binders and plasticizers can be added to the slurry using techniques known in the art. The material is spray dried to provide granules amenable to pressing, preferably in the range of about 10 microns to 150 microns in size.

The spray dried granules are subsequently pressed in Step 120, preferably by uniaxial or isostatic pressing to achieve a pressed density to as close to 60% of the x-ray theoretical density as possible. In addition, other known methods such as tape casting, tape calendaring or extrusion may be employed as well to form the unfired body.

The pressed material is subsequently processed through a calcining process in Step 122. Preferably, the pressed material is placed on a setter plate made of material such as alumina which does not readily react with the garnet material. The setter plate is heated in a periodic kiln or a tunnel kiln in air or pressure oxygen in the range of between about 850° C.-1600° C. to obtain a dense ceramic compact. Other known treatment techniques, such as induction heat, hot pressing, fast firing, or assisted fast firing, may also be used in this step. In some embodiments, a density having >98% of the theoretical density can be achieved.

The dense ceramic compact is machined in the Step 124 to achieve dimensions suitable or the particular applications.

Fabrication of Radiofrequency Devices

Figure 4:
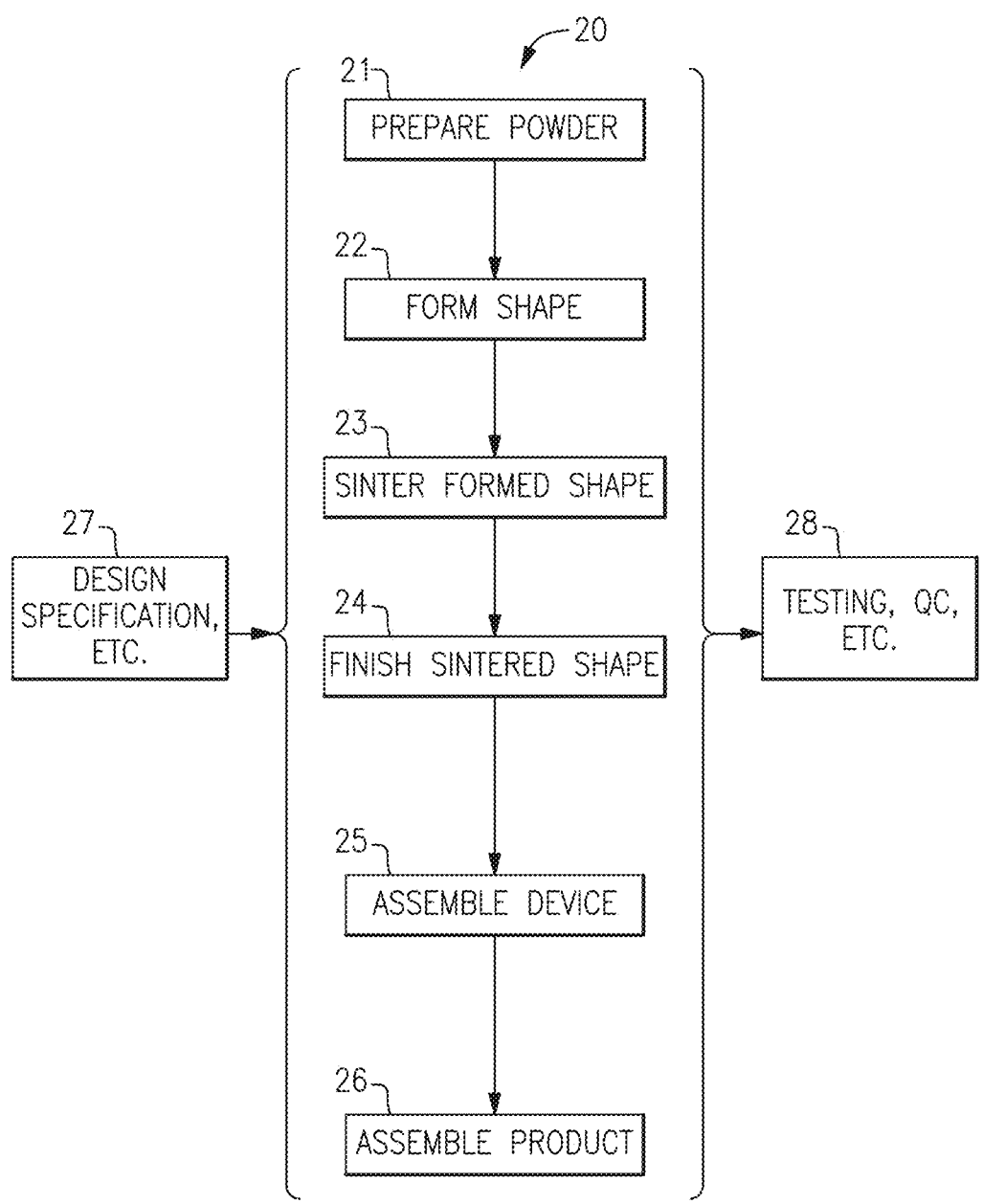
FIG. 4 shows a process that can be implemented to fabricate a composite ceramic material having one or more features as described herein.

FIGS. 4-8 show examples of how radiofrequency devices having one or more features as described herein can be fabricated. FIG. 4 shows a process 20 that can be implemented to fabricate a ceramic material having one or more of the foregoing properties. In block 21, powder can be prepared. In block 22, a shaped object can be formed from the prepared powder. In block 23, the formed object can be sintered. In block 24, the sintered object can be finished to yield a finished ceramic object having one or more desirable properties.

In implementations where the finished ceramic object is part of a device, the device can be assembled in block 25. In implementations where the device or the finished ceramic object is part of a product, the product can be assembled in block 26.

FIG. 4 further shows that some or all of the steps of the example process 20 can be based on a design, specification, etc. Similarly, some or all of the steps can include or be subjected to testing, quality control, etc.

In some implementations, the powder preparation step (block 21) of FIG. 4 can be performed by the example process described in reference to FIG. 3. Powder prepared in such a manner can include one or more properties as described herein, and/or facilitate formation of ceramic objects having one or more properties as described herein.

Figure 5:
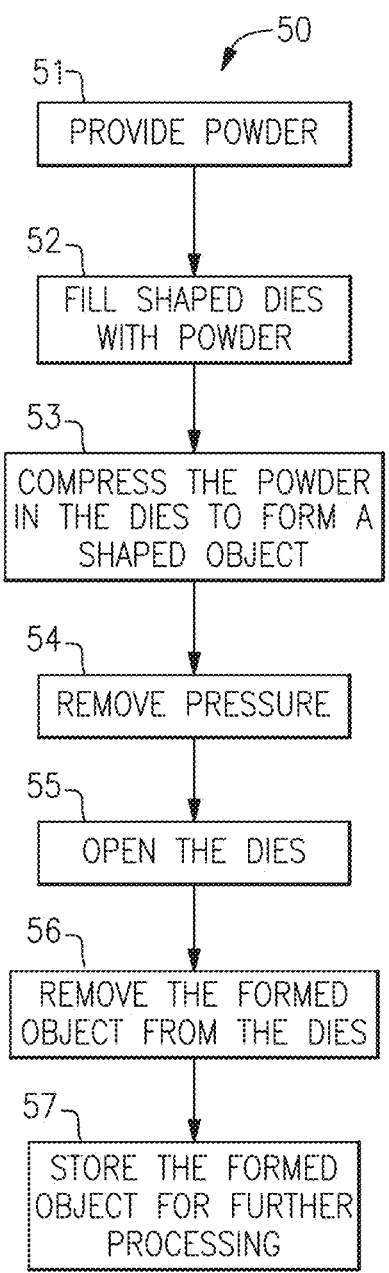
FIG. 5 shows a process that can be implemented to form a shaped object from powder material described herein.
Figure 6:
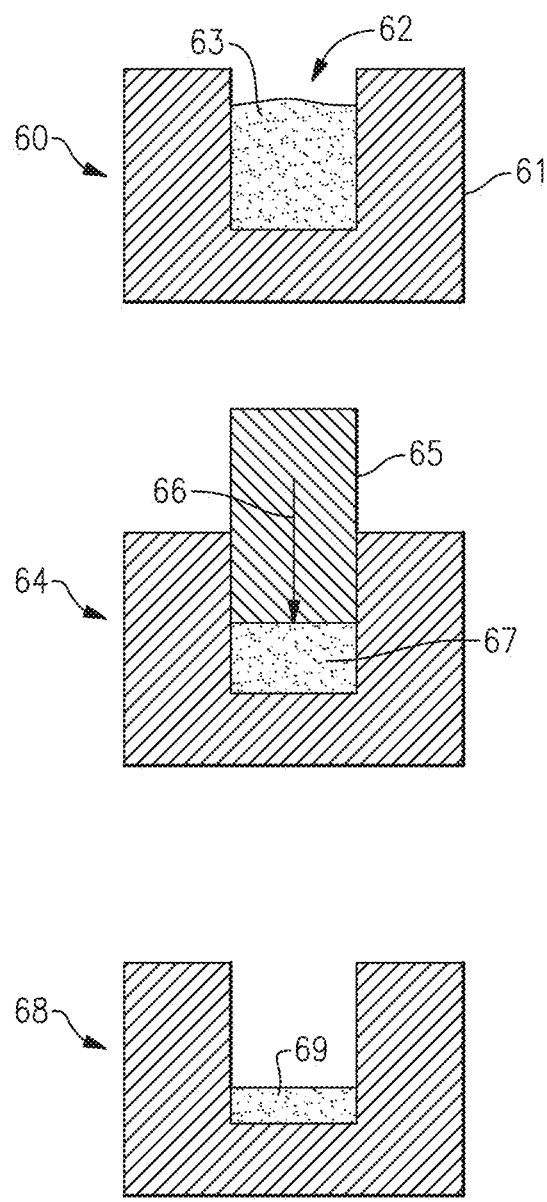
FIG. 6 shows examples of various stages of the process of FIG. 5.

In some implementations, powder prepared as described herein can be formed into different shapes by different forming techniques. By way of examples, FIG. 5 shows a process 50 that can be implemented to press-form a shaped object from a powder material prepared as described herein. In block 52, a shaped die can be filled with a desired amount of the powder. In FIG. 6, configuration 60 shows the shaped die as 61 that defines a volume 62 dimensioned to receive the powder 63 and allow such power to be pressed. In block 53, the powder in the die can be compressed to form a shaped object. Configuration 64 shows the powder in an intermediate compacted form 67 as a piston 65 is pressed (arrow 66) into the volume 62 defined by the die 61. In block 54, pressure can be removed from the die. In block 55, the piston (65) can be removed from the die (61) so as to open the volume (62). Configuration 68 shows the opened volume (62) of the die (61) thereby allowing the formed object 69 to be removed from the die. In block 56, the formed object (69) can be removed from the die (61). In block 57, the formed object can be stored for further processing.

Figures 7, 8:
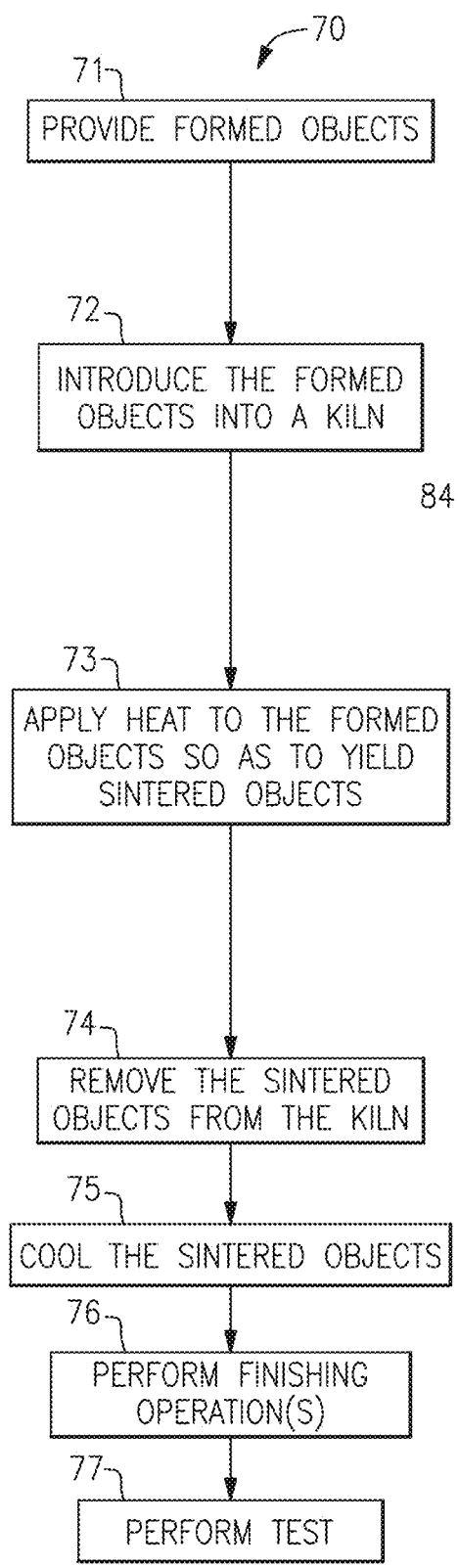
FIG. 7 shows a process that can be implemented to sinter formed objects such as those formed in the example of FIGS. 5 and 6.
FIG. 8 shows examples of various stages of the process of FIG. 7.

In some implementations, formed objects fabricated as described herein can be sintered to yield desirable physical properties as ceramic devices. FIG. 7 shows a process 70 that can be implemented to sinter such formed objects. In block 71, formed objects can be provided. In block 72, the formed objects can be introduced into a kiln. In FIG. 8, a plurality of formed objects 69 are shown to be loaded into a sintering tray 80. The example tray 80 is shown to define a recess 83 dimensioned to hold the formed objects 69 on a surface 82 so that the upper edge of the tray is higher than the upper portions of the formed objects 69. Such a configuration allows the loaded trays to be stacked during the sintering process. The example tray 80 is further shown to define cutouts 83 at the side walls to allow improved circulation of hot gas at within the recess 83, even when the trays are stacked together. FIG. 8 further shows a stack 84 of a plurality of loaded trays 80. A top cover 85 can be provided so that the objects loaded in the top tray generally experience similar sintering condition as those in lower trays.

In block 73, heat can be applied to the formed objects so as to yield sintered objects. Such application of heat can be achieved by use of a kiln. In block 74, the sintered objects can be removed from the kiln. In FIG. 8, the stack 84 having a plurality of loaded trays is depicted as being introduced into a kiln 87 (stage 86a). Such a stack can be moved through the kiln (stages 86b, 86c) based on a desired time and temperature profile. In stage 86d, the stack 84 is depicted as being removed from the kiln so as to be cooled.

In block 75, the sintered objects can be cooled. Such cooling can be based on a desired time and temperature profile. In block 206, the cooled objects can undergo one or more finishing operations. In block 207, one or more tests can be performed.

Heat treatment of various forms of powder and various forms of shaped objects are described herein as calcining, firing, annealing, and/or sintering. It will be understood that such terms may be used interchangeably in some appropriate situations, in context-specific manners, or some combination thereof.

Application of the Material

One or more embodiments of the disclosed composite ceramic can provide a framework to develop real world devices in the field of electronics, including, but not limited to, radiofrequency (or RF). Electronic components used in radio frequency preferably have improved Q, a high dielectric constant, high thermal conductivity, and a temperature coefficient of resonant frequency near 0. Embodiments of the disclosed composite ceramic can provide for a ceramic material having such advantageous qualities. In some embodiments, the material can be used for any high power device that is susceptible to rapid heating where a high dielectric constant ceramic is used.

Embodiments of the composite ceramics can have applications in electronic devices and can be incorporated into numerous types of RF devices including antennas, transformers, inductors, and circulators.

Figure 9:
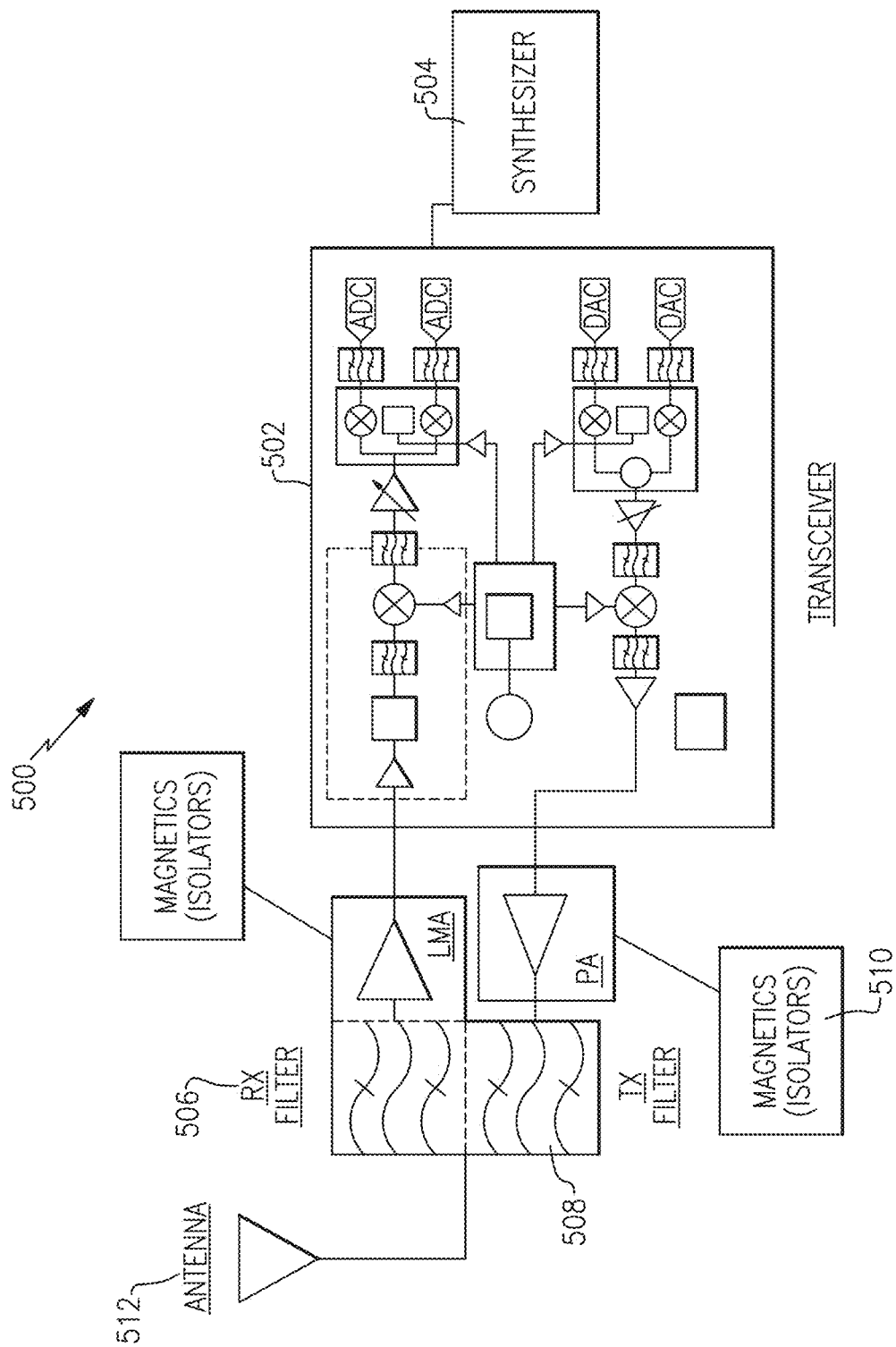
FIG. 9 illustrates a telecommunication base station system incorporating an embodiment of a composite ceramic material disclosed herein.

FIG. 9 illustrates a telecommunication base station system 500 comprising a transceiver 502, a synthesizer 504, an RX filter 506, a TX filter 508, and magnetic isolators 510 and an antenna 512. The magnetic isolators 510 can be incorporated in a single channel PA and connector pad, integrated triplate or microstrip drop-in. In preferred implementations, the magnetic isolators 510 comprise an embodiment of the disclosed composite ceramic.

Figure 10:
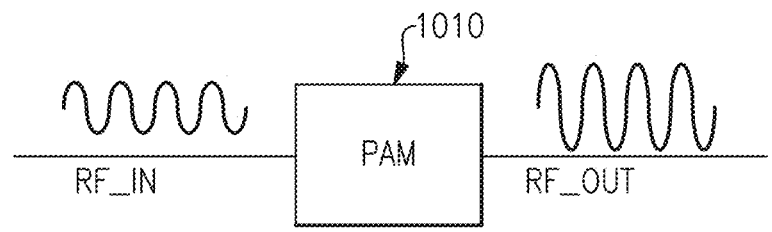
FIG. 10 illustrates an embodiment of a power amplifier module which can use embodiments of the disclosed material.
Figure 11:
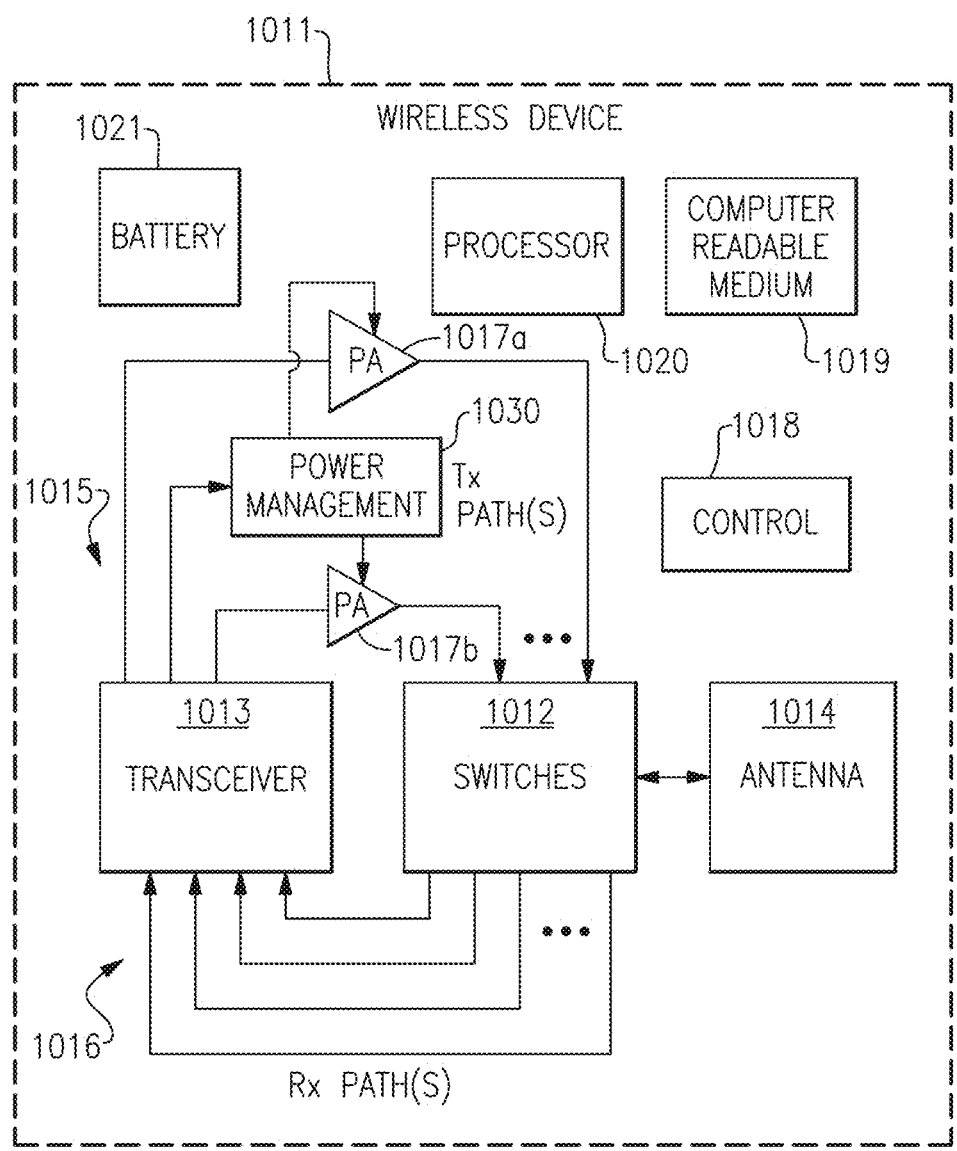
FIG. 11 illustrates an embodiment of a wireless device which can use embodiments of the disclosed material.

FIGS. 10 and 11 respectively illustrate a power amplifier module 1010 and wireless device 1011 which can include one or more radio frequency devices implemented using any of the methods, materials, and devices of the present disclosure. For instance, the power amplifier module 1010 and the wireless device 1011 can include one or more antennas, transformers, inductors, circulators, absorbers, or other RF devices or other devices implemented according to the present disclosure, including devices incorporating an embodiment of the disclosed composite ceramic.

FIG. 10 is a schematic diagram of a power amplifier module (PAM) 1010 for amplifying a radio frequency (RF) signal. The illustrated power amplifier module 1010 amplifies an RF signal (RF_IN) to generate an amplified RF signal (RF_OUT).

FIG. 11 is a schematic block diagram of an example wireless or mobile device 1011. The example wireless device 1011 depicted in FIG. 11 can represent a multi-band and/or multi-mode device such as a multi-band/multi-mode mobile phone. By way of examples, Global System for Mobile (GSM) communication standard is a mode of digital cellular communication that is utilized in many parts of the world. GSM mode mobile phones can operate at one or more of four frequency bands: 850 MHz (approximately 824-849 MHz for Tx, 869-894 MHz for Rx), 900 MHz (approximately 880-915 MHz for Tx, 925-960 MHz for Rx), 1800 MHz (approximately 1710-1785 MHz for Tx, 1805-1880 MHz for Rx), and 1900 MHz (approximately 1850-1910 MHz for Tx, 1930-1990 MHz for Rx). Variations and/or regional/national implementations of the GSM bands are also utilized in different parts of the world.

Code division multiple access (CDMA) is another standard that can be implemented in mobile phone devices. In certain implementations, CDMA devices can operate in one or more of 800 MHz, 900 MHz, 1800 MHz and 1900 MHz bands, while certain W-CDMA and Long Term Evolution (LTE) devices can operate over, for example, 22 or more radio frequency spectrum bands.

One or more features of the present disclosure can be implemented in the foregoing example modes and/or bands, and in other communication standards. For example, 802.11, 2G, 3G, 4G, LTE, and Advanced LTE are non-limiting examples of such standards. To increase data rates, the wireless device 1011 can operate using complex modulated signals, such as 64 QAM signals.

In certain embodiments, the wireless device 1011 can include switches 1012, a transceiver 1013, an antenna 1014, power amplifiers 1017a, 1017b, a control component 1018, a computer readable medium 1019, a processor 1020, a battery 1021, and a power management system 1030, any of which can include embodiments of the disclosed material.

The transceiver 1013 can generate RF signals for transmission via the antenna 1014. Furthermore, the transceiver 1013 can receive incoming RF signals from the antenna 1014.

It will be understood that various functionalities associated with the transmission and receiving of RF signals can be achieved by one or more components that are collectively represented in FIG. 11 as the transceiver 1013. For example, a single component can be configured to provide both transmitting and receiving functionalities. In another example, transmitting and receiving functionalities can be provided by separate components.

Similarly, it will be understood that various antenna functionalities associated with the transmission and receiving of RF signals can be achieved by one or more components that are collectively represented in FIG. 11 as the antenna 1014. For example, a single antenna can be configured to provide both transmitting and receiving functionalities. In another example, transmitting and receiving functionalities can be provided by separate antennas. In yet another example, different bands associated with the wireless device 1011 can operate using different antennas.

In FIG. 11, one or more output signals from the transceiver 1013 are depicted as being provided to the antenna 1014 via one or more transmission paths 1015. In the example shown, different transmission paths 1015 can represent output paths associated with different bands and/or different power outputs. For instance, the two example power amplifiers 1017a, 1017b shown can represent amplifications associated with different power output configurations (e.g., low power output and high power output), and/or amplifications associated with different bands. Although FIG. 11 illustrates a configuration using two transmission paths 1015 and two power amplifiers 1017a, 1017b, the wireless device 1011 can be adapted to include more or fewer transmission paths 1015 and/or more or fewer power amplifiers.

In FIG. 11, one or more detected signals from the antenna 1014 are depicted as being provided to the transceiver 1013 via one or more receiving paths 1016. In the example shown, different receiving paths 1016 can represent paths associated with different bands. For example, the four example receiving paths 1016 shown can represent quad-band capability that some wireless devices are provided with. Although FIG. 11 illustrates a configuration using four receiving paths 1016, the wireless device 1011 can be adapted to include more or fewer receiving paths 1016.

To facilitate switching between receive and transmit paths, the switches 1012 can be configured to electrically connect the antenna 1014 to a selected transmit or receive path. Thus, the switches 1012 can provide a number of switching functionalities associated with operation of the wireless device 1011. In certain embodiments, the switches 1012 can include a number of switches configured to provide functionalities associated with, for example, switching between different bands, switching between different power modes, switching between transmission and receiving modes, or some combination thereof. The switches 1012 can also be configured to provide additional functionality, including filtering and/or duplexing of signals.

FIG. 11 shows that in certain embodiments, a control component 1018 can be provided for controlling various control functionalities associated with operations of the switches 1012, the power amplifiers 1017a, 1017b, the power management system 1030, and/or other operating components.

In certain embodiments, a processor 1020 can be configured to facilitate implementation of various processes described herein. The processor 1020 can implement various computer program instructions. The processor 1020 can be a general purpose computer, special purpose computer, or other programmable data processing apparatus.

In certain embodiments, these computer program instructions may also be stored in a computer-readable memory 1019 that can direct the processor 1020 to operate in a particular manner, such that the instructions stored in the computer-readable memory 1019.

The illustrated wireless device 1011 also includes the power management system 1030, which can be used to provide power amplifier supply voltages to one or more of the power amplifiers 1017a, 1017b. For example, the power management system 1030 can be configured to change the supply voltages provided to the power amplifiers 1017a, 1017b to improve efficiency, such as power added efficiency (PAE). The power management system 1030 can be used to provide average power tracking (APT) and/or envelope tracking (ET). Furthermore, as will be described in detail further below, the power management system 1030 can include one or more low dropout (LDO) regulators used to generate power amplifier supply voltages for one or more stages of the power amplifiers 1017a, 1017b. In the illustrated implementation, the power management system 1030 is controlled using a power control signal generated by the transceiver 1013. In certain configurations, the power control signal is provided by the transceiver 1013 to the power management system 1030 over an interface, such as a serial peripheral interface (SPI) or Mobile Industry Processor Interface (MIPI).

In certain configurations, the wireless device 1011 may operate using carrier aggregation. Carrier aggregation can be used for both Frequency Division Duplexing (FDD) and Time Division Duplexing (TDD), and may be used to aggregate a plurality of carriers or channels, for instance up to five carriers. Carrier aggregation includes contiguous aggregation, in which contiguous carriers within the same operating frequency band are aggregated. Carrier aggregation can also be non-contiguous, and can include carriers separated in frequency within a common band or in different bands.

As mentioned above, circuits and devices having one or more features as described herein can be implemented in RF applications such as a wireless base-station. Such a wireless base-station can include one or more antennas configured to facilitate transmission and/or reception of RF signals. Such antenna(s) can be coupled to circuits and devices having one or more circulators/isolators as described herein.

Figure 12:
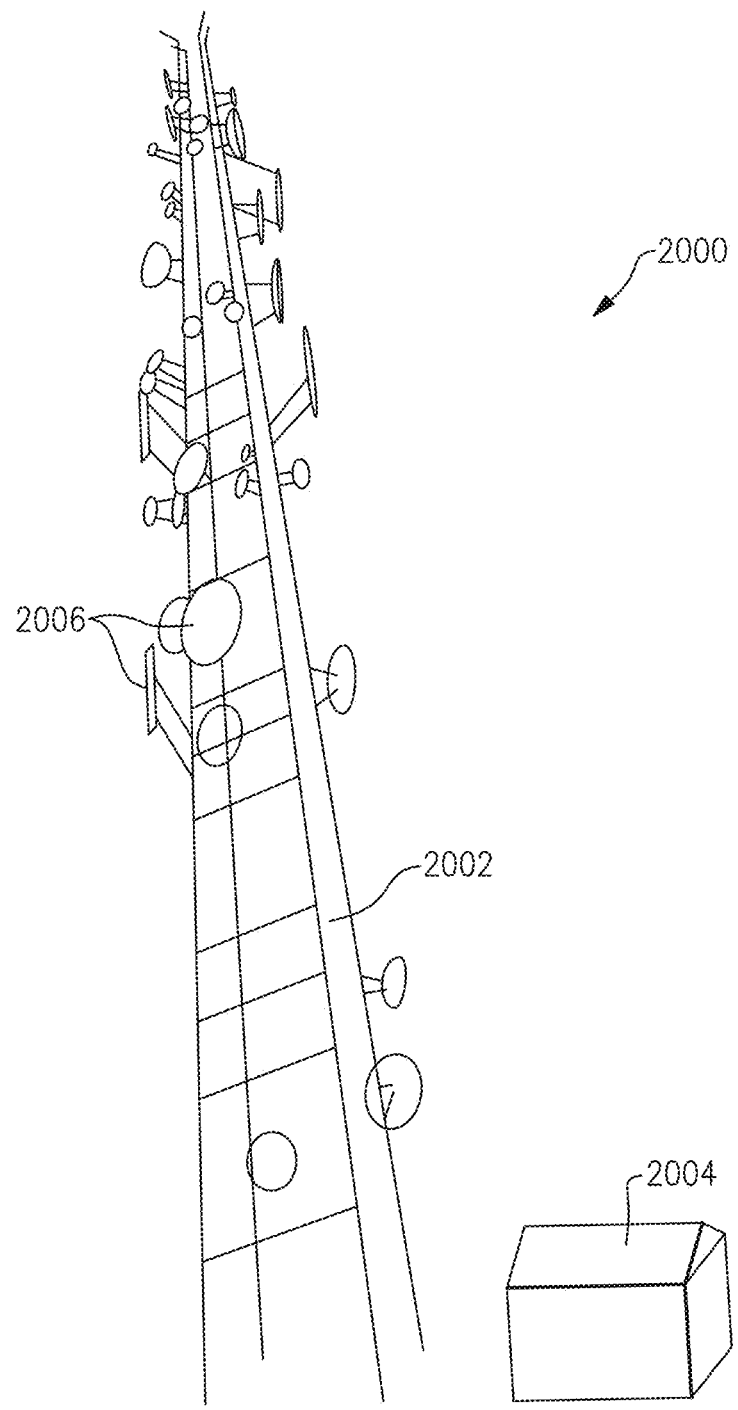
FIG. 12 illustrates a perspective view of a cellular antenna base station incorporating embodiments of the disclosure.

Thus, in some embodiments, the above disclosed material can be incorporated into different components of a telecommunication base station, such as used for cellular networks and wireless communications. An example perspective view of a base station 2000 is shown in FIG. 12, including both a cell tower 2002 and electronics building 2004. This can include the components discussed above with respect to FIG. 9. The cell tower 2002 can include a number of antennas 2006, typically facing different directions for optimizing service, which can be used to both receive and transmit cellular signals while the electronics building 2004 can hold electronic components such as filters, amplifiers, etc. discussed below. Both the antennas 2006 and electronic components can incorporate embodiments of the disclosed ceramic materials.

Figure 13:
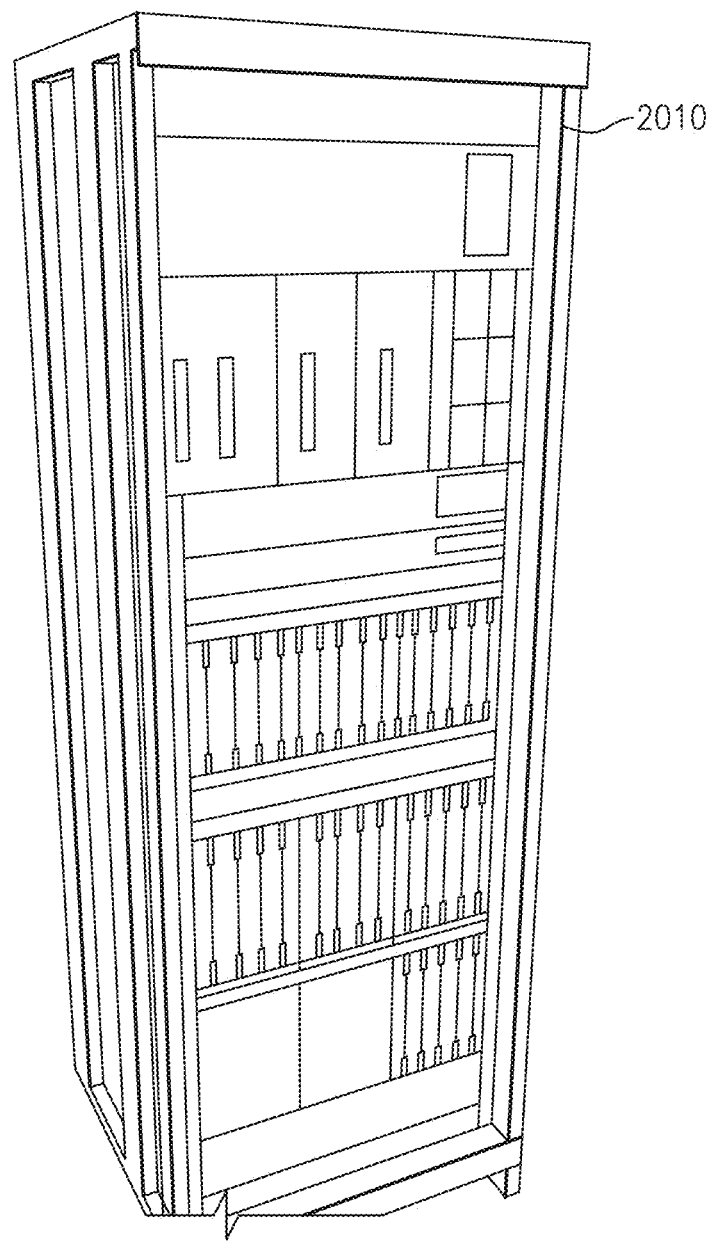
FIG. 13 illustrates housing components of a base station incorporating embodiments of the disclosed material.

FIG. 13 illustrates hardware 2010 that can be used in the electronics building 2004, and can include the components discussed above. For example, the hardware 2010 can be a base station subsystem (BSS), which can handle traffic and signaling for the mobile systems.

Figure 14:
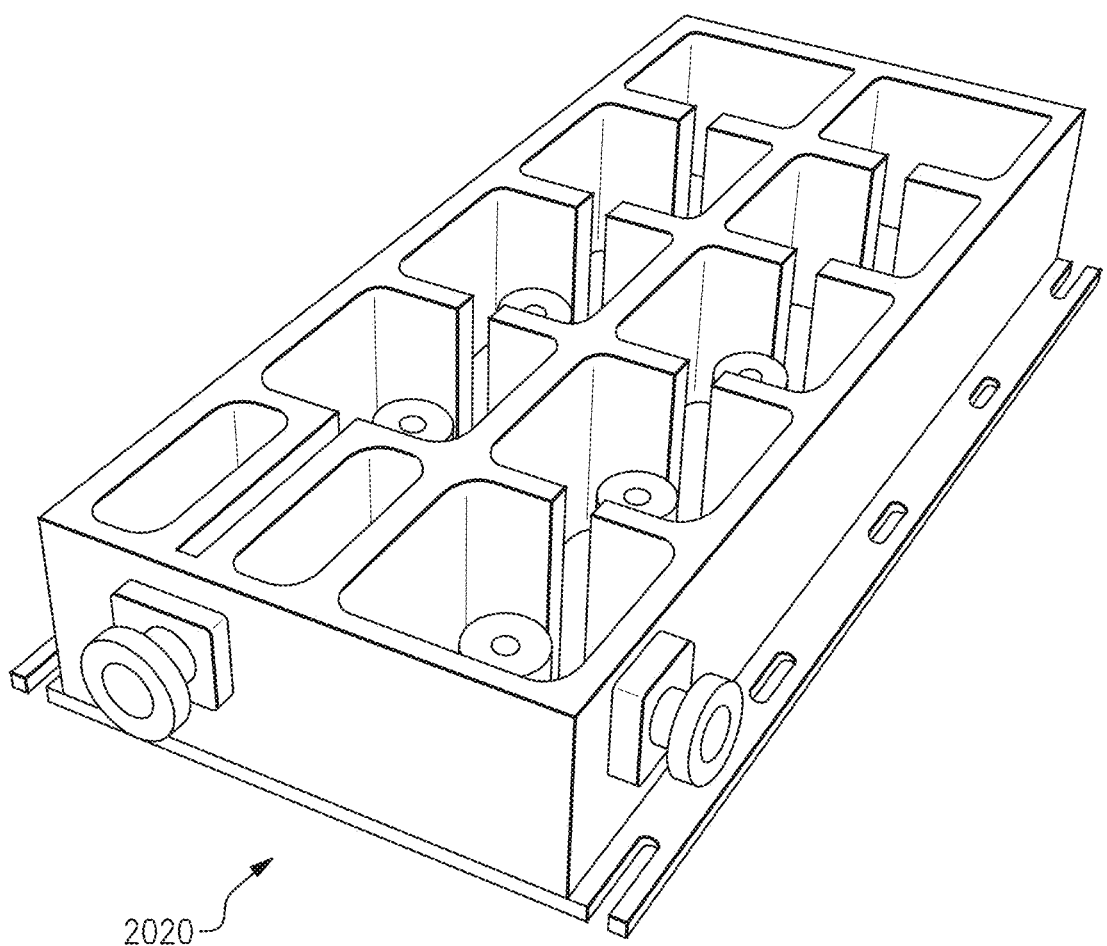
FIG. 14 illustrates a cavity filter used in a base station incorporating embodiments of the material disclosed herein.

FIG. 14 illustrates a further detailing of the hardware 2010 discussed above. Specifically, FIG. 14 depicts a cavity filter/combiner 2020 which can be incorporated into the base station. The cavity filter 2020 can include, for example, bandpass filters such as those incorporating embodiments of the disclosed material, and can allow the output of two or more transmitters on different frequencies to be combined.

In some embodiments, the materials disclosed herein can be incorporated into solid-state lighting (SSL). Typical SSLs can incorporate different types of light-emitting diodes for the production of light, such as semiconductor light-emitting diodes (LEDs), organic light-emitting diodes (OLEDs) or polymer light-emitting diodes (PLEDs). SSLs can provide advantages over other types of lighting systems such as electrical filaments, plasma, or gas. For example, SSLs can have improved lifetime, improved energy savings, better quality of light, improved safety, and improved durability.

Figure 15:
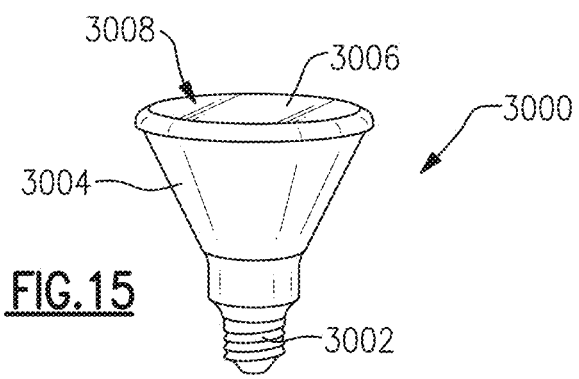
FIG. 15 illustrates an embodiment of a solid-state light bulb incorporating embodiments of the disclosed ceramic.

FIG. 15 illustrates an embodiment of an SSL light bulb 3000 which can incorporate the above-disclosed ceramics. As shown, the light bulb 3000 can include a base connector 3002 for providing electricity to the light bulb 3000. Further, the light bulb 3000 can include a housing 3004 attached, either permanently or reversibly, from the base connector 3002. In some embodiments, the housing 3004 can include a clear, partially clear, colored, etc. top 3006 where light can be directed. Inside the housing 3004 can be one or more LEDs 3008 which can provide the light for the light bulb 3000.

Figure 16:
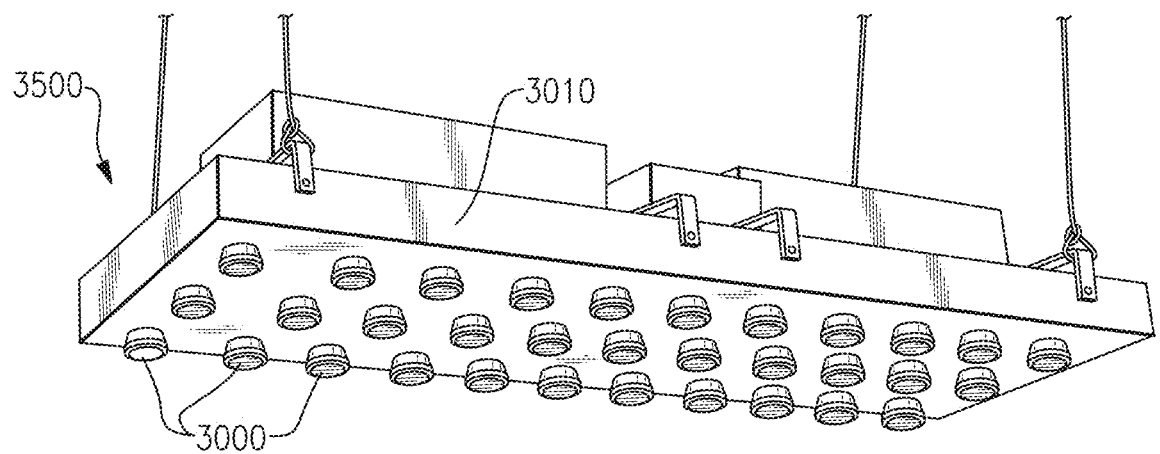
FIG. 16 illustrates an embodiment of a plurality of solid-state light bulbs incorporating embodiments of the disclosed ceramic.

FIG. 16 illustrates and example application of the light bulb 3000 as, for example, a hanging light setup 3500. As shown in the figure, a plurality of light bulbs 3000 can be incorporated into a substrate 3010. In some embodiments, the light bulbs 3000 can be electrically connected, either in series or in parallel, to provide additional light.

In some embodiments, SSLs incorporating the disclosed ceramics can be used in a number of different applications, such as lightbulbs, traffic lights, vehicle lights, street/parking lights, buildings (exterior and interior), remote controls, as well as other applications. The particular SSL application is not limiting.

From the foregoing description, it will be appreciated that inventive composite ceramics having advantageous properties and method of manufacturing are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A radiofrequency component formed from a ceramic material comprising:
    a primary phase of aluminum oxide;
    a first secondary phase of $CaTiO_3$; and
    a second secondary phase of $LaAlO_3$, the first and second secondary phases located within the primary phase forming a composite ceramic material, the composite ceramic material having a dielectric constant of greater than 20 and a thermal conductivity of greater than 20 $W \cdot m^{-1} \cdot K^{-1}$.

2. The radiofrequency component of claim 1 wherein the radiofrequency component is incorporated into solid state lighting.

3. The radiofrequency component of claim 1 wherein the radiofrequency component is incorporated into a cellular tower.

4. The radiofrequency component of claim 1 wherein the primary phase is generally contiguous.

5. The radiofrequency component of claim 1 wherein the composite ceramic material has a dielectric constant of greater than 25.

6. The radiofrequency component of claim 1 wherein the composite ceramic material has a dielectric constant of greater than 35.

7. The radiofrequency component of claim 1 wherein the composite ceramic material has a thermal conductivity of greater than 30 $W \cdot m^{-1} \cdot K^{-1}$.

8. A radiofrequency component formed from a ceramic material comprising:
    a primary phase of aluminum oxide;
    a first secondary phase of $CaTiO_3$; and
    a second secondary phase of $La_2MgTiO_6$, the first and second secondary phases located within the primary phase forming a composite ceramic material, the composite ceramic material having a dielectric constant of greater than 20 and a thermal conductivity of greater than 20 $W \cdot m^{-1} \cdot K^{-1}$.

9. The radiofrequency component of claim 8 wherein the radiofrequency component is incorporated into solid state lighting.

10. The radiofrequency component of claim 8 wherein the radiofrequency component is incorporated into a cellular tower.

11. The radiofrequency component of claim 8 wherein the primary phase is generally contiguous.

12. The radiofrequency component of claim 8 wherein the composite ceramic material has a dielectric constant of greater than 25.

13. The radiofrequency component of claim 8 wherein the composite ceramic material has a dielectric constant of greater than 35.

14. The radiofrequency component of claim 8 wherein the composite ceramic material has a thermal conductivity of greater than 30 $W \cdot m^{-1} \cdot K^{-1}$.

15. A radiofrequency component formed from a ceramic material comprising:
    a primary phase of aluminum oxide;
    a first secondary phase of $CaTiO_3$; and
    a second secondary phase selected from the group consisting of $LaAlO_3$, $La_2MgTiO_6$, $YAlO_3$, $SmAlO_3$, $Mg_4Nb_2O_9$, and $La_4Ti_3O_{12}$, the first and second secondary phases located within the primary phase forming a composite ceramic material, the composite ceramic material having a dielectric constant of greater than 20.

16. The radiofrequency component of claim 15 wherein the radiofrequency component is incorporated into solid state lighting.

17. The radiofrequency component of claim 15 wherein the radiofrequency component is incorporated into a cellular tower.

18. The radiofrequency component of claim 15 wherein the composite ceramic material has a dielectric constant of greater than 25.

19. The radiofrequency component of claim 15 wherein the composite ceramic material has a dielectric constant of greater than 35.

20. The radiofrequency component of claim 15 wherein the composite ceramic material has a thermal conductivity of greater than 20 $W \cdot m^{-1} \cdot K^{-1}$.

* * * * *